(No Model.)
J. ERNST.
VISE.
No. 370,937. Patented Oct. 4, 1887.
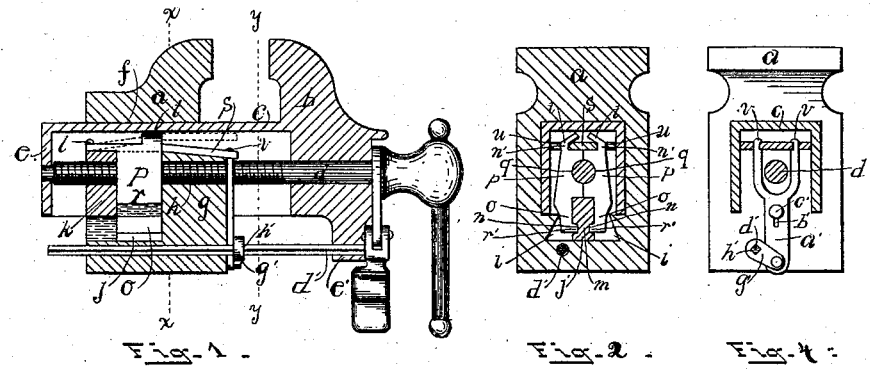
Fig. 1. Fig. 2. Fig. 4.
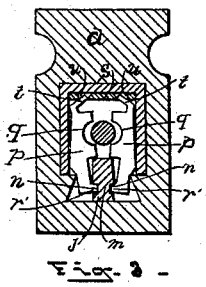
Fig. 3.
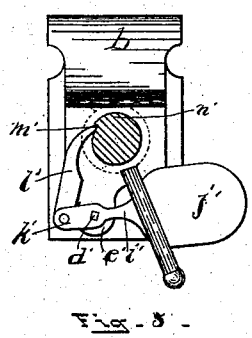 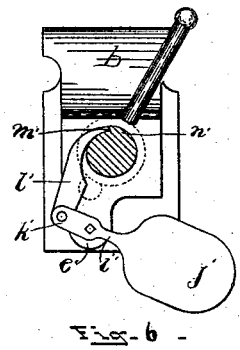
Fig. 5. Fig. 6.
ATTEST:
W. H. Power
William Goldie
INVENTOR:
John Ernst.
By Jas. E. Thomas.
Atty.

UNITED STATES PATENT OFFICE.

JOHN ERNST, OF BAY CITY, MICHIGAN.

VISE.

SPECIFICATION forming part of Letters Patent No. 370,937, dated October 4, 1887.

Application filed July 28, 1887. Serial No. 245,545. (No model.)

*To all whom it may concern:*

Be it known that I, JOHN ERNST, a citizen of the United States, residing at Bay City, in the county of Bay and State of Michigan, have invented certain new and useful Improvements in Vises; and I do declare the following to be a full, clear, and exact description of the invention, such as will enable others skilled in the art to which it appertains to make and use the same, reference being had to the accompanying drawings, and to the letters and figures of reference marked thereon, which form a part of this specification.

This invention relates to improvements in that class of vises which are provided with means of disengaging the nut from the screw in order to allow the screw to be drawn freely back and forth, as desired, for more quickly opening or closing the vise-jaws than by turning the screw for that purpose in the common way.

Various devices are in use for the purpose of disengaging the screw, as before stated; but they all, so far as I am able to learn, however, have to be operated by a separate movement from that of the screw-lever—that is to say, that the screw must be turned backward and then some other portion of the device operated upon to release the nut from the screw, which requires a separate movement of the hand, which must leave the screw-lever to operate the releasing device.

The object of my invention is to arrange a device whereby the screw may be released from engagement with the nut by the action of the screw and screw-lever when operated to release the tension of the screw.

The invention consists, chiefly, in the combination, with a vise having a nut capable of being freed from engagement with the screw, of devices operating by means of the backward action of the screw-lever to free the said nut from engagement with the screw, as I hereinafter more fully describe and claim.

I do not limit my invention to operating any particular form of devices engaging with the screw in the place of a nut, as the improvement is capable of being applied to and operating almost any of the various forms of said devices; but for convenience of illustration and to make the explanation I illustrate in the drawings a device having a divided or two-part nut, which is the subject of a former application by myself for Letters Patent, which have already been allowed.

In the drawings above referred to, Figure 1 represents a longitudinal vertical central section of a vise having my improvement. Fig. 2 is a section at X X in Fig. 1, and shows the nut closed or in engagement with the screw. Fig. 3 is the same with the nut open or disengaged. Fig. 4 is a sectional view at $y\ y$. Fig. 5 is a front view of the vise and of my improvement in position when the nut is disengaged, as in Fig. 3. Fig. 6 is the same when the nut is engaged with the screw.

$a$ represents the rear or stationary jaw of the vise, and $b$ is the front or movable jaw, provided with the hollow arm $c$, which passes through an opening in the lower portion of the jaw $a$; and $d$ is the screw, which is passed through the jaw $b$ and longitudinally through the hollow arm, and is supported at its inner end by the piece $e$, which closes the inner end of the arm.

The front portion of the opening $f$ is partially closed by a portion, $g$, extending upward from the base of the jaw into the hollow arm, and is provided with an opening, $h$, through which passes the screw. The bottom of the opening $f$ is provided with a dovetail groove, $i$, extending from the rear edge to the portion $g$. In this dovetail groove is placed the supporting-piece $j$, the rear portion, $k$, entirely filling the hollow space in the arm and extending nearly to the top thereof, and is provided on its upper edge with the lugs or hooks $l$. The inner portion of the piece $j$ is reduced in width and depth, and is provided with the grooves $n$ on its opposite sides and leaving spaces between the inner edges of the dovetail groove $i$ and the part $m$, and into these spaces is placed the lower ends, $o$, of the parts $p$ of a divided nut, $r$. These portions $p$ are placed on opposite sides of and extend above the screw $d$, and are provided with threaded recesses $q$, which fit over and engage with the screw, and the lower ends, $o$, are provided with inwardly-projecting portions $r'$, which fit into the grooves $n$, while the outer sides bear against the edges of the dovetail and hold the pieces in position.

The upper ends of the parts $p$ are provided with arms $f$, extending diagonally inward, the upper sides of the arms meeting at an angle the outside edges of the pieces, and a plate, $s$, provided with openings $u$, fitting over the arms $t$, is placed horizontally above the screw and extends rearward above the part $k$, and is hinged at its rear end to the part $k$ by catching over the hooks $l$, while the opposite end, extending forward and above and beyond the part $g$, is provided with notches $v$, into which are caught the upper ends of the lifting-piece $a'$, which is placed vertically in front of the part $g$, below the screw, and provided with upwardly-extending arms which pass on opposite sides of the screw to the plate $s$. A slot, $b'$, is formed in the pieces $a'$, and a screw, $c'$, is passed through the slot and into the part $g$, holding the piece in position and allowing it to move vertically and raise and lower the front end of the plate $s$.

Below and on one side of the screw is a rod, $d'$, passed through the base of the jaw $a$, and extending forward through a portion, $e'$, which projects downward from the jaw $b$. This rod is of rectangular form, and is secured to the portion $e'$ in a manner to move with the jaw $b$ and slide through the base of the jaw $a$; and $g'$ is an arm provided with an opening, $h'$, in one end, of rectangular form, through which is passed the rod, and the opposite end of the arm is pivoted to the lower end of the lifting-piece $a'$.

Upon the outer or front end of the rod $d'$ is rigidly secured a lever, $i'$, one end of which is provided with a weight, $j'$, while the opposite end, $k'$, is pivoted to one of a pawl, $l'$. The opposite or free end of the pawl $l'$ reaches upward and engages with one or more notches or teeth, $m'$, which are formed in the collar $n'$ of the screw $d$. The operation of the weighted end of this lever $i'$ is to at all times turn the rod $d'$ to close or engage the two-part nut with the screw, and which in this case operates on the nut through the arm $g'$, the vertical piece $a'$, and the plate $s$, the weighted lever operating to draw downward upon the piece $a'$, and the plate $s$ rests upon the upper ends of the portions $p$, the openings $u$ passing over a reduced portion, $n'$, thereof, so that the parts $p$ are held firmly and solidly together, and by raising upon the weighted end of the lever the rod is oscillated, and the arm $g'$ and lifting-piece $a'$ operate to lift the free end of the plate $s$, and the arms $t$, sliding through the openings $v$, spread apart the pieces $p$ and free the nut from the screw; and with this device and others of a similar nature the operation of turning or oscillating the rod has been heretofore accomplished by operating the rod with the hand, which makes an extra movement of the hand, and herein lies the benefit of my invention, in which, as the screw-lever is turned back for releasing the strain on the jaws, the pawl $l'$ engages with the notch $m'$ in the screw-collar, which operates to oscillate the rod $d'$ and release the nut from engagement with the screw without releasing the hand from the screw-lever, and the jaw $b$ may be then freely moved to the desired position by the hand at the lever, and whenever the said position is reached the lever is turned for closing the jaws together, which releases the pawl from action, and the weighted end of the lever $l'$ oscillates the rod in the opposite direction and closes the two-part nut into engagement with the screw, which then operates in the same manner as in an ordinary vise.

As hereinbefore stated, the two-part nut and the portions connecting the same with the oscillating rod are only drawn and described herein in order to explain and illustrate the operation of my improvement, as the rod $d'$ and the lever $i'$ and pawl $l'$ may be easily attached to other forms of nut-operating mechanism.

What I claim, broadly, and desire to secure by Letters Patent, is—

The combination, in a vise, of the front and rear jaws, the screw passing through the jaws and having a collar provided with notches or teeth, a nut capable of engagement or disengagement with the screw, and an oscillating rod passed through the rear jaw and secured to and moving with the front jaw and provided with nut-operating devices, with a lever rigidly secured to the rod and a pawl pivoted to the free end of the lever by one end and with its opposite free end engaging with the notches in the screw-collar, substantially as and for the purpose set forth.

In testimony whereof I affix my signature in presence of two witnesses.

JOHN ERNST.

Witnesses:
WILLIAM GOLDIE,
JAS. E. THOMAS.